United States Patent [19]
Autor et al.

[11] Patent Number: 5,964,875
[45] Date of Patent: Oct. 12, 1999

[54] METHOD AND APPARATUS FOR IDENTIFICATION OF FEATURES ASSOCIATED WITH COMPUTERS

[75] Inventors: Jeffrey S. Autor, Houston; Gregory T. Noren, The Woodlands; John S. Lacombe, Tomball, all of Tex.

[73] Assignee: Compaq Computer Corporation, Houston, Tex.

[21] Appl. No.: 08/921,968

[22] Filed: Sep. 2, 1997

[51] Int. Cl.⁶ .................................................. G06F 9/06
[52] U.S. Cl. ............................. 713/100; 714/37; 714/47
[58] Field of Search ................................. 395/651, 500, 395/704, 180, 652, 425; 340/172.5; 714/37, 38, 39, 40, 47, 1; 713/1, 2, 100

[56] References Cited

U.S. PATENT DOCUMENTS

| | | | |
|---|---|---|---|
| 3,763,474 | 10/1973 | Freeman et al. | 340/172.5 |
| 3,771,131 | 11/1973 | Ling | 340/172.5 |
| 3,771,144 | 11/1973 | Belady et al. | 340/172.5 |
| 3,906,454 | 9/1975 | Martin | 340/172.5 |
| 5,291,585 | 3/1994 | Sato et al. | 395/500 |
| 5,325,509 | 6/1994 | Lautzenheiser | 395/425 |
| 5,586,324 | 12/1996 | Sato et al. | 395/652 |
| 5,720,024 | 2/1998 | Saito et al. | 395/180 |
| 5,768,568 | 6/1998 | Inui et al. | 395/500 |
| 5,805,891 | 9/1998 | Bizuneh et al. | 395/704 |

OTHER PUBLICATIONS

Kevin G. Depew, "Systems Division System Information Table Specification", Version 2.00, Systems Division ROM Development, COMPAQ Computer Corporation, May 24, 1996.

*Primary Examiner*—Kevin A. Kriess
*Attorney, Agent, or Firm*—Akin, Gump, Strauss, Hauer & Feld, L.L.P.

[57] ABSTRACT

Improved techniques for facilitating identification of a computer system's hardware features to software executing on the computer system are disclosed. In one embodiment, the software is system management software that serves to monitor and control the computer system to reduce failures and/or improve performance. In a general sense, the invention provides a system feature table within a computer system to describe each of the hardware features of the computer system, including feature data and appropriate access mechanisms for additional information. In addition, a user can be notified when the software does not support all the hardware features of the computer system. The invention also is able to identify locations of failing hardware features for easy replacement or examination.

31 Claims, 10 Drawing Sheets

| DC-DC BOARD TYPE | BOARD SLOT | NO. CONVERTERS | SCAN CHAIN BYTE | SCAN CHAIN BITS FOR STATUS & PRESENCE |
|---|---|---|---|---|
| PROCESSOR | 6 | 3, 1 | 7 | 3:4 |
| PCI | 1 | 4, 3 | 9 | 1:2 |

FIG. 2 (PRIOR ART)

| BIT | SUPPORT |
|---|---|
| 0 | FAN SUPPORTED |
| 1 | FAN REDUNDANT |
| 2 | MACHINE-W |
| 3 | MACHINE-X |
| 4 | MACHINE-Y |
| 5 | MACHINE-Z |

| FEATURE IDENTIFIER | FEATURE DATA | STATUS | CONTROL | PRESENCE | INIT. |
|---|---|---|---|---|---|
| FAN | NUMBER<br>LOCATION<br>REQUIRED<br>CPU-FAN<br>REDUNDANT | MECHANISM POSITION | MECHANISM POSITION | MECHANISM POSITION | MECHANISM ACTION |
| THERMAL TRIP SENSOR | NUMBER<br>LOCATION<br>REQUIRED<br>REDUNDANT<br>CAUTION<br>  THRESHOLD<br>CRITICAL<br>  THRESHOLD | MECHANISM POSITION | MECHANISM POSITION | MECHANISM POSITION | MECHANISM ACTION |
| ⋮ | ⋮ | ⋮ | ⋮ | ⋮ | ⋮ |

| FEATURE | FEATURE IDENTIFIER | FEATURE DATA | STATUS | CONTROL | PRESENCE |
|---|---|---|---|---|---|
| FAN | 0010 | 1<br>0110<br>1<br>1<br>0 | ASIC-A<br>20<br>3 | ASIC-A<br>20<br>4 | ASIC-A<br>2<br>1 |
| THERMAL TRIP SENSOR | 1000 | 1<br>0011<br>0<br>0<br>1000<br>1100 | ScanChain<br>5<br>1 | ScanChain<br>16<br>7 | ScanChain<br>5<br>2 |

| FEATURE | FEATURE IDENTIFIER | FEATURE DATA | STATUS | CONTROL | PRESENCE |
|---|---|---|---|---|---|
| FAN | 0010 | 1<br>0110<br>1<br>1<br>0 | ASIC-A<br>20<br>4 | ASIC-A<br>20<br>5 | ScanChain<br>4<br>3 |
| THERMAL TRIP SENSOR | 1000 | 1<br>0011<br>0<br>0<br>1000<br>1100 | ScanChain<br>5<br>1 | ScanChain<br>16<br>7 | ScanChain<br>5<br>2 |

METHOD AND APPARATUS FOR IDENTIFICATION OF FEATURES ASSOCIATED WITH COMPUTERS

BACKGROUND OF THE INVENTION

1. Field of the Invention

The present invention relates to a computer system and, more particularly, to identification of features of a computer system to software executing on the computer system.

2. Description of the Related Art

Computer systems are known to include a variety of different hardware features. These hardware features also tend to be implemented differently in different computers (even from the same company). However, conventional software executing on the computers must understand not only the hardware features present but also how the hardware features are implemented in order to interact with the hardware features. One type of software that often interacts with hardware features of a computer system is known as system management software which monitors and controls the computer system to reduce system crashes or catastrophic failures or to improve performance.

Hardware features include many different apparatuses within a computer system. A few examples of hardware features are: fans, DC-DC converters, power supplies, thermal trip sensor, bus monitors, and the like. Different computer systems have different hardware features which are implemented differently. Although in subsequent versions of the same computer system the hardware features present tend to be the same, these hardware features can be implemented differently in the various versions of the same computer system. For example, computer systems generally include a fan for cooling purposes. However, some computer systems include multiple required fans, and other computer systems may include multiple fans some of which are redundant (i.e., not required).

Hence, with each different computer system, not only are the hardware features provided usually different, but also the placement of the hardware features and hardware for accessing the hardware features that are common tends to be different. Even with subsequent versions of the same computer system, occasionally some of the hardware features are placed differently and/or use different hardware for accessing the hardware features.

Nevertheless, in order for system software to properly monitor the operation of the computer system and its hardware features, the system software needs to know what features are provided in the computer system. A number of different techniques have been used in recent years to inform the software of the features provided by the computer system.

One conventional approach is to provide a table within the system software that would identify each machine on which the software could be executed. The major disadvantages of this approach were that the number of tables in the software grew exponentially in order to handle all the existing machines on which the software could be executed, and that the software was not operational on new machines.

Figure 1:
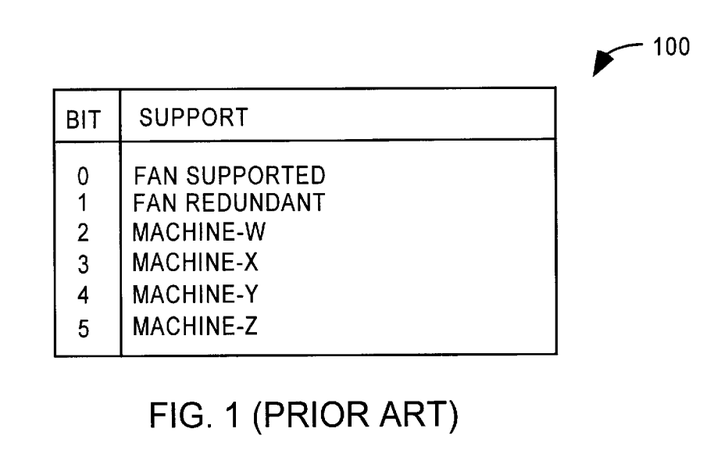
FIG. 1 is a diagram of a simplified ROM table that provides feature information in a computer system in a conventional manner.

Another conventional approach is to provide a read only memory (ROM) within the computer system to describe the hardware features of the computer system. The system software was then able to access the ROM and obtain some limited information on the hardware features of the computer system. This approach is effective so long as the software supports the features of the computer system. One problem with this approach is that the size of the ROM, even though typically describing features of only a single computer system, grows exponentially to handle the myriad of different implementations that develop with subsequent versions of the computer system. With each different implementation the software assumed a particular way to access the needed signals from the hardware features. The hardware of the computer system was then thereafter fixed with that particular way of accessing the hardware feature. However, if the access to the hardware features were to be changed for a different implementation, the software would fail unless the ROM had been specially updated to include a specific description of the different implementation. FIG. 1 is a diagram of a ROM table according to this conventional approach.

More particularly, FIG. 1 is a diagram of a simplified ROM table 100 that provides hardware feature information for a computer system. Here, the particular feature is a fan and the bits of the ROM table 100 identify whether the fan is supported by the computer system, whether the fan is a redundant fan, and then provides additional information that is specific to the implementation of the computer system, namely machine-w, machine-x, machine-y, and machine-z. For example, if the six (6) bits of the ROM 100 were "110010", this would signal the software that the fan is provided in the computer system, is a redundant fan, and follows a machine specific implementation for machine-Z. The software then assumes how to access the fan based on the machine specific implementation for machine-Z. The required support for the system software to produce and maintain all of the machine specific implementations is overly burdensome.

Figure 2:
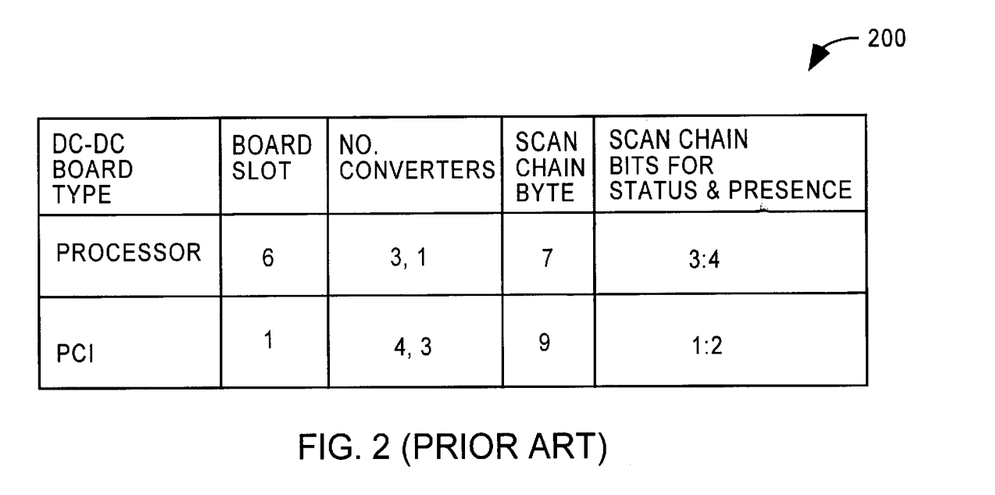
FIG. 2 is a diagram of a ROM table providing information about a DC—DC converter feature of a computer system in a conventional manner.

Another approach to inform software of features of a computer system is illustrated in a simplified ROM table 200 illustrated in FIG. 2. In the ROM table 200, information about a DC-DC converter feature of a computer system is provided. In the ROM table 200 the information provided indicates the board type, board slot, number of converters (provided, necessary), scan chain bytes, and status chain bits for status and presence information. For example, the information provided in the first row in the ROM table 200 indicates that the particular DC—DC converter is a processor board type in slot 6; that there are three (3) DC—DC converters provided of which one (1) is necessary; and that the presence and status information are obtained from bits 3 and 4 of byte 7 in a scan chain. Although some information was provided for locating status and presence information of specific features, the mechanisms used to acquire the status and presence information were fixed. Further, software maintenance was still burdensome even under this approach because the access mechanism was fixed and because the mechanism information was provided only for this specific feature and not provided on a global basis.

Thus, there is a need for improved techniques for facilitating identification of hardware features of computer systems to software such that the software is able to access the hardware features.

SUMMARY OF THE INVENTION

Broadly speaking, the invention relates to improved techniques for facilitating identification of a computer system's hardware features to software executing on the computer system. The invention also monitors the computer system's hardware features to identify failing or degraded hardware features. In one embodiment, the software is system management software that serves to monitor and control the computer system to reduce failures and/or improve performance. In a general sense, the invention provides a system feature table (hardware resources table) within a computer system to describe each of the hardware features of the computer system, including feature data and appropriate access mechanisms for additional information. In addition, the software can notify a user when the software does not support all the hardware features of the computer system. The invention also is able to identify locations of failing hardware features for easy replacement or examination. Further, the hardware features are also able to be associated for redundancy purposes.

The invention can be implemented in numerous ways, including as a device, a system, an apparatus, a method, or a computer readable medium. Several embodiments of the invention are discussed below.

As a computer monitoring system, an embodiment of the invention includes: a computer system being monitored, the computer system includes a plurality of hardware features that provide presence and status information on the respective hardware features within the computer system; a system features table that stores feature information for the plurality of hardware features of the computer system, the feature information for each of the hardware features includes feature data that defines characteristics of the associated hardware feature, and an access mechanism and a position within the access mechanism for retrieving the presence information for the associated hardware feature; and software management software for performing system monitoring of the hardware of the computer system by retrieving the feature information on the respective hardware features from the system features table. Preferably, the feature information for each of the hardware features further includes an access mechanism and a position within the access mechanism for retrieving the status information for the associated hardware feature and/or an access mechanism and a position within the access mechanism for retrieving control information for the associated hardware feature.

As a method for monitoring a computer system having a plurality of hardware features and a hardware resources table containing information on the hardware resources of the computer system, an embodiment of the invention includes the operations of: receiving a service request by a particular hardware feature of the computer system; retrieving locations of at least one of presence information and status information for the particular hardware feature from the hardware resources table for the computer system, the location of the presence information including an access mechanism and a position within the access mechanism, and the location of the status information including an access mechanism and a position within the access mechanism; obtaining at least one of presence information and status information for the particular hardware feature, the presence information being obtained using the retrieved location of the presence information, and the status information being obtained using the retrieved location of the status information; and performing an appropriate action for the computer system based on the at least one of the presence information and the status information obtained.

As a computer readable medium containing program instructions for monitoring a computer system having a plurality of hardware features and a hardware resources table containing information on the hardware resources of the computer system, an embodiment of the invention includes: first computer readable code for receiving a service request by a particular hardware feature of the computer system; second computer readable code for retrieving a location of condition information for the particular hardware feature from the hardware resources table for the computer system, the location of the condition information including an access mechanism and a position within the access mechanism from which the condition information can be obtained; third computer readable code for obtaining the condition information for the particular hardware feature, the condition information being obtained using the retrieved location of the condition information; and fourth computer readable code for performing an appropriate action for the computer system based on the condition information obtained.

As a disk storage monitoring system, an embodiment of the invention includes: a disk storage apparatus being monitored, the disk storage apparatus includes a plurality of hardware features that provide presence and status information on the respective hardware features within the disk storage apparatus; a system features table that stores feature information for the plurality of hardware features of the disk storage apparatus, the feature information for each of the hardware features includes feature data that defines characteristics of the associated hardware feature, and an access mechanism and a position within the access mechanism for retrieving the presence information for the associated hardware feature; and software management software for performing system monitoring of the hardware of the disk storage apparatus by retrieving the feature information on the respective hardware features from the system features table.

As a computer system, an embodiment of the invention includes: a plurality of hardware features; a hardware resources table containing information on the hardware features; a processing unit for carrying out program instructions; memory for storing data; and a system monitoring unit. The system monitoring unit includes at least: means for receiving a service request by a particular hardware feature of the computer system; means for retrieving a location of condition information for the particular hardware feature from the hardware resources table for the computer system, the location of the condition information including an access mechanism and a position within the access mechanism from which the condition information can be obtained; means for obtaining the condition information for the particular hardware feature, the condition information being obtained using the retrieved location of the condition information; and means for performing an appropriate action for the computer system based on the condition information obtained.

The advantages of the invention are numerous. One advantage of the invention is that changes to hardware implementations concerning features of a computer system are easily made and require only updating a system features table. Another advantage of the invention is that access mechanisms and positions therein of status and presence information for various features within a computer system are identified. As a result, the access mechanism as well as its position within the access mechanism is able to be changed without impacting the software in many cases. Still another advantage of the invention is that a user of the computer system can be notified of certain failed features or components within the computer system, preferably including notification of the physical location of the failed feature or component within the computer system. Yet another advantage of the invention is the ability to inform a user when a feature or mechanism (typically newly added or modified feature) is not recognized and therefore unsupported by the software. As an example, the user might be informed that it is time to upgrade software when features or mechanisms are unsupported. Another advantage of the invention is the ability to monitor and report on degraded hardware conditions, such as a loss of redundancy conditions. Still another advantage of the invention is the ability to monitor and report on status changes to features or components (e.g., change in power supply consumption, bus utilization near peak threshold).

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for facilitating identification of a computer system's hardware features to software executing on the computer system. Preferably, the software is system management software that serves to monitor and control the computer system to reduce failures and/or improve performance. In a general sense, the invention provides a system feature table (hardware resources table) within a computer system to describe each of the hardware features of the computer system, including feature data and appropriate access mechanisms for additional information. In addition, a user can be notified when the software does not support all the hardware features of the computer system. The invention also is able to identify locations of failing hardware features for easy replacement or examination.

Embodiments of the invention are discussed below with reference to FIGS. 3–10 However, those skilled in the art will readily appreciate that the detailed description given herein with respect to these figures is for explanatory purposes as the invention extends beyond these limited embodiments.

Figure 3:
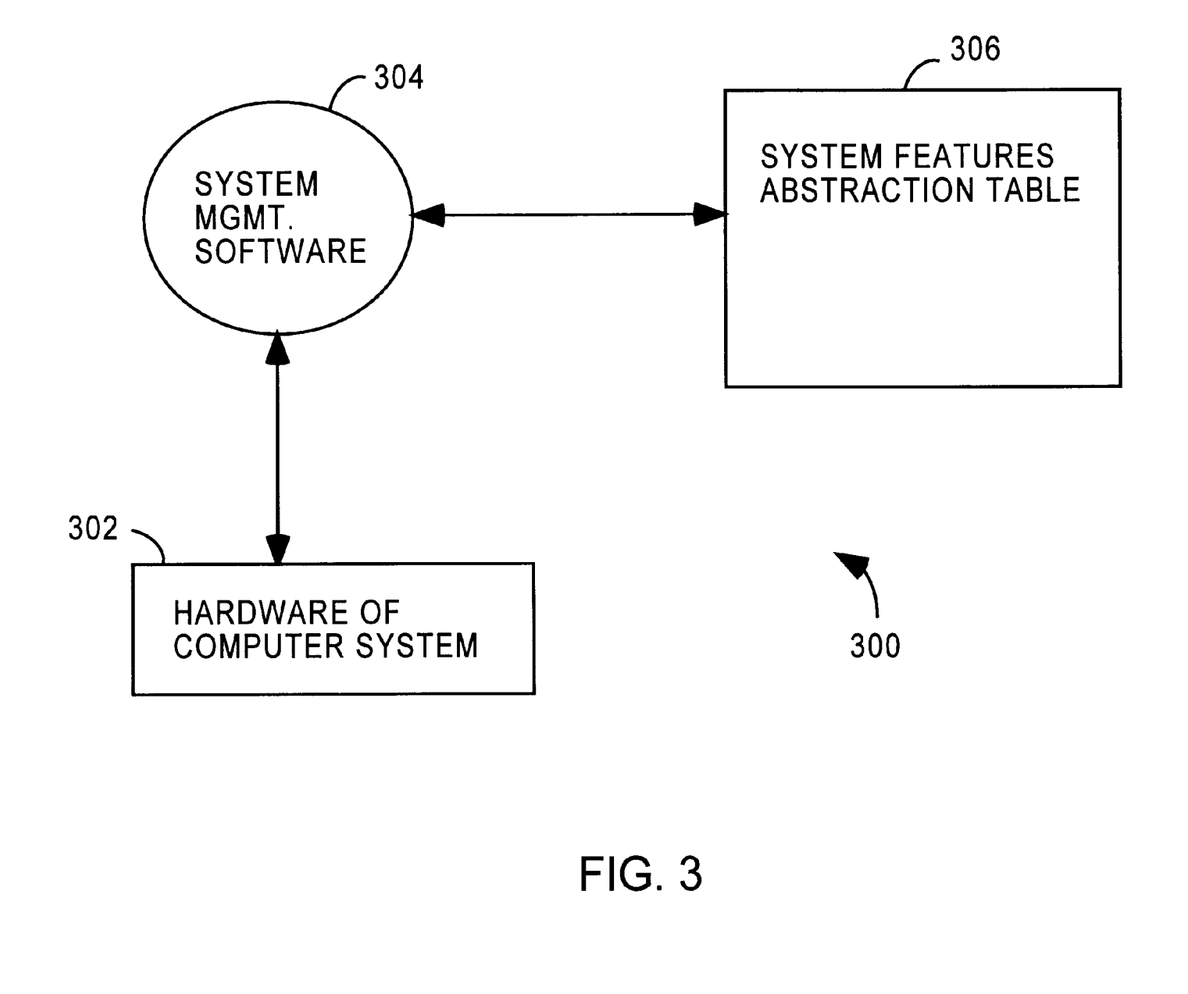
FIG. 3 is a block diagram of a computer monitoring system according to a basic embodiment of the invention.

FIG. 3 is a block diagram of a computer monitoring system 300 according to a basic embodiment of the invention. The computer monitoring system 300 operates to monitor hardware 302 of a computer system. The hardware 302 of the computer system is generally understood by those in the computer field, and typically includes integrated circuits, wiring, circuit boards, data storage devices, and various other components. The hardware 302 of the computer system also includes a plurality of hardware features. It is the hardware features of the hardware 302 of the computer system that are monitored. Examples of the hardware features include fans, DC—DC converters, power supplies, thermal trip sensor, bus monitors, and the like.

The computer monitoring system 300 also includes system management software 304 and a system features abstraction table 306. The system management software 304 interacts with the hardware 302 of the computer system to obtain status and presence information for various features of the hardware 302 of the computer system. The system management software 304 may also obtain redundancy information. The status and presence information (and possibly redundancy information) is used by the system management software 304 to monitor the computer system, and take appropriate actions to report on degraded hardware conditions (e.g., non-critical hardware faults), reduce failures and/or improve performance.

The system features abstraction table 306 allows the system management software 304 to identify the particular features of the hardware 302 of the computer system. The system features abstraction table 306 is preferably inseparable from the particular computer system so that it is guaranteed to be present. The systems features abstraction table 306 is also preferably operating system independent. Further, the system features abstraction table 306 provides location information to the system management software 304 so that the system management software 304 is able to acquire the presence and status information from the particular features of the hardware 302.

Figure 4:
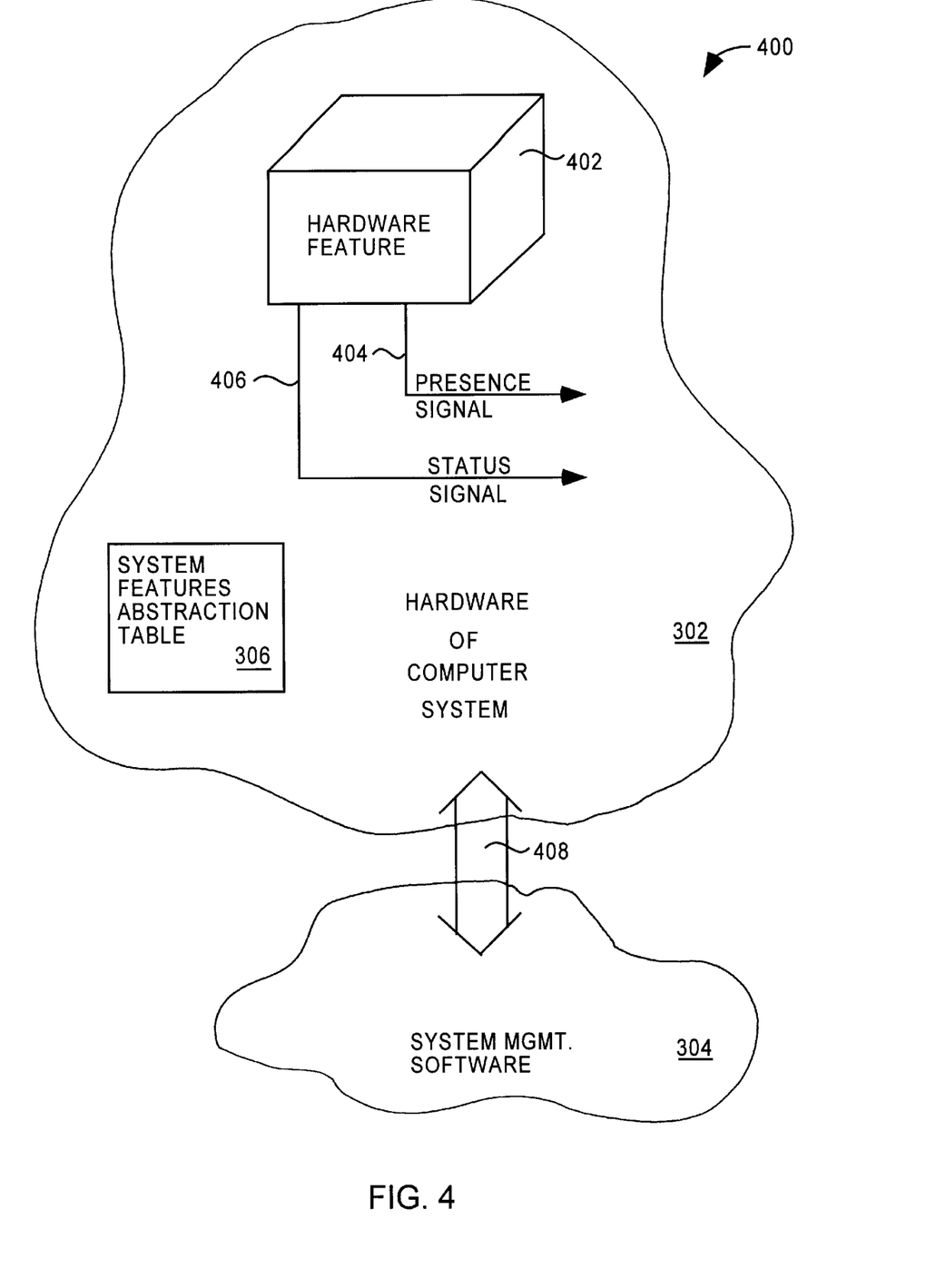
FIG. 4 is a diagram of a computer system according to an embodiment of the invention.

FIG. 4 is a diagram of a computer monitoring system 400 according to an embodiment of the invention. The computer monitoring system 400 is a more detailed implementation of the computer system monitor 300 illustrated in FIG. 3.

The computer monitoring system 400 includes the hardware 302 of the computer system 302 and the system management software 304. The system features abstraction table 306 is also provided within the hardware 302 of the computer system. Preferably, the system features abstraction table 306 is provided within a read-only memory (ROM) of the computer system. However, the systems feature abstraction table 306 could be provided within the computer system using other types of data storage (e.g., disk storage or random-access memory).

The computer monitoring system 400 has numerous hardware features. One such hardware feature is hardware feature 402 illustrated in FIG. 4. The hardware feature 402 produces a presence signal 404 and a status signal 406. The system features abstraction table 306 informs the system management software 304 via the communication link 408 of not only the hardware features within the hardware 302 of the computer system but also how to access these hardware features to obtain their presence and status signals. In this embodiment, the system management software 304 would be able to access the presence signal 404 and the status signal 406 of the hardware feature 402 via the communication link 408 in order to monitor whether the hardware feature 402 is provided, and if provided, whether operating properly.

Figure 5A:
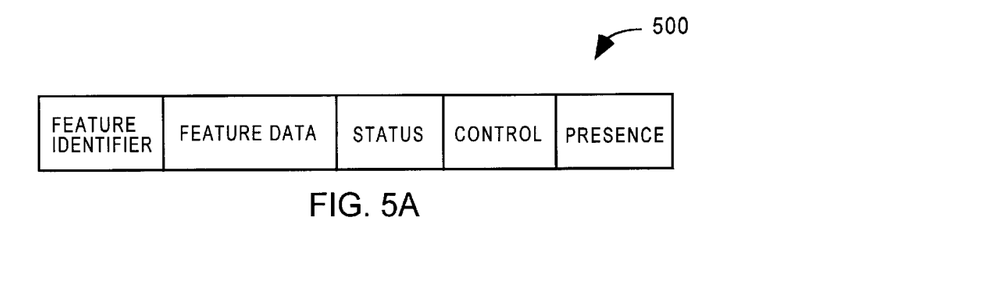
FIG. 5A is a diagram illustrating a basic system features abstraction table according to one implementation of the invention.

FIG. 5A is a diagram illustrating a basic system features abstraction table 500 according to one implementation of the invention. The basic system features abstraction table 500 includes information for a plurality of hardware features. The information provided in the basic system features abstraction table 500 includes various categories of information for each of the hardware features, including a feature identifier, characteristics of the feature (feature data), status information, control information, and presence information.

Figure 5B:
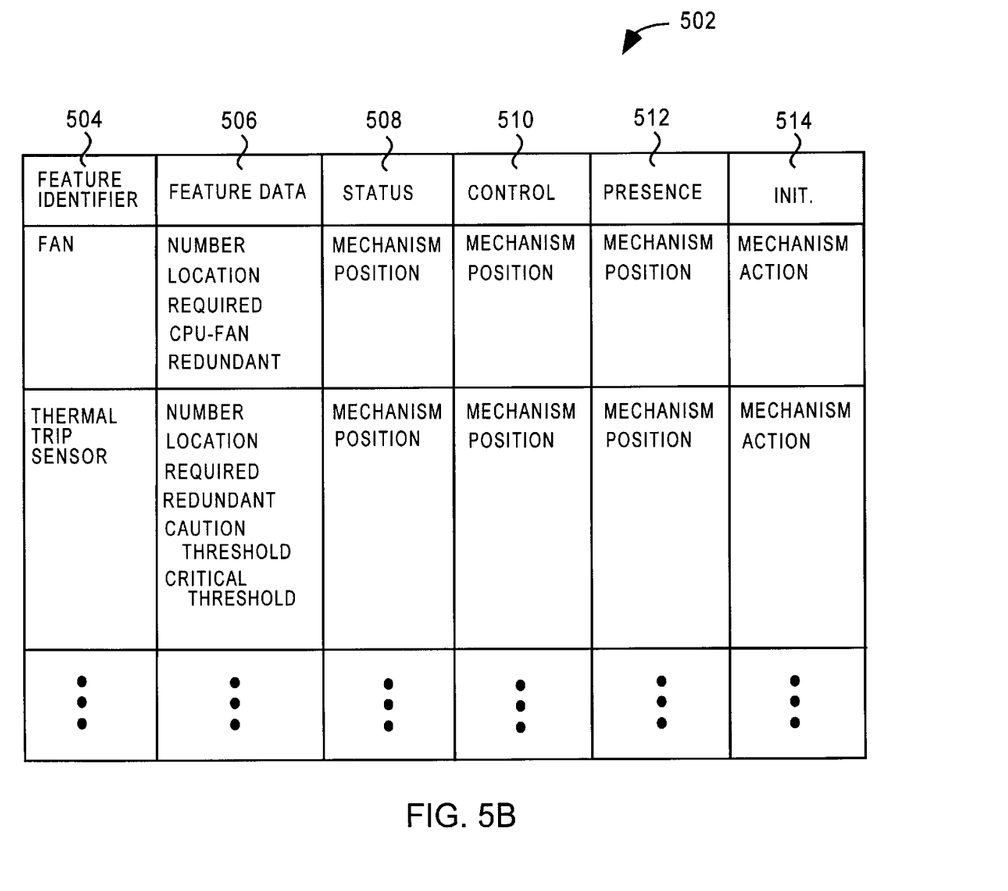
FIG. 5B is a diagram of a system features abstraction table for a computer system having a fan and a thermal trip sensor among other hardware features.

FIG. 5B is a diagram of a system features abstraction table 502 for a computer system having a fan and a thermal trip sensor among other hardware features. The system features abstraction table 502 includes the same categories of information as the table 500 illustrated in FIG. 5A. Each row in the system features abstraction table 502 pertains to a different hardware feature of the computer system. In the system features abstraction table 502 illustrated in FIG. 5B, representative information is provided for a fan and a thermal trip sensor as hardware features. More particularly, for each hardware feature, the system features abstraction table 502 includes: a feature identifier 504, feature data 506, status information 508, control information 510, and presence information 512. The feature data 506 for the fan indicates the number, the physical location, whether required or not, whether a CPU-fan or not, and whether redundant or not. The physical location indicates where the particular hardware feature is physically located within the computer system. For example, for the fan, the physical location might indicate that the fan is located in a CPU area (or some other area). The status information 508 indicates an access mechanism and position (location) within the mechanism for obtaining the status information for the fan feature. The control information 510 indicates an access mechanism and a position within the mechanism for obtaining the control information for the fan feature. The presence information 512 provides an access mechanism and a position within the mechanism for obtaining the presence information for the fan feature. As examples, the access mechanism might be Chip-A; ScanChain; or Inter-IC bus ($I_2C$), and the positions might be port number; byte, bits; or device number. In some cases, there might not be a need for a position within the mechanism. In any case, the system management software 304 understands how to utilize these access mechanisms to obtain the status, control or presence information.

As for the thermal trip sensor feature, the system features abstraction table 502 also provides different information. The feature data 506 for the thermal trip sensor identifies the number for the thermal trip sensor, the physical location of the thermal trip sensor, whether required or not, whether redundant or not, a caution threshold temperature, and a critical threshold temperature. The status information 508, the control information 510 and the presence information 512 each indicate an access mechanism and location for the thermal trip sensor.

Although the basic system features abstraction table 500 does not include initialization information, the system feature abstractions table may include initialization information. For example, the systems features abstraction table 502 may include initialization information 514. The initialization information 514 provides an access mechanism and action needed to initialize the associated hardware feature when the system management processing is started. For example, the mechanism might refer to an I/O port and the action might request that a particular byte be set at the I/O port. In general, the actions, for example, can be used to start counters or set modes.

Figure 6:
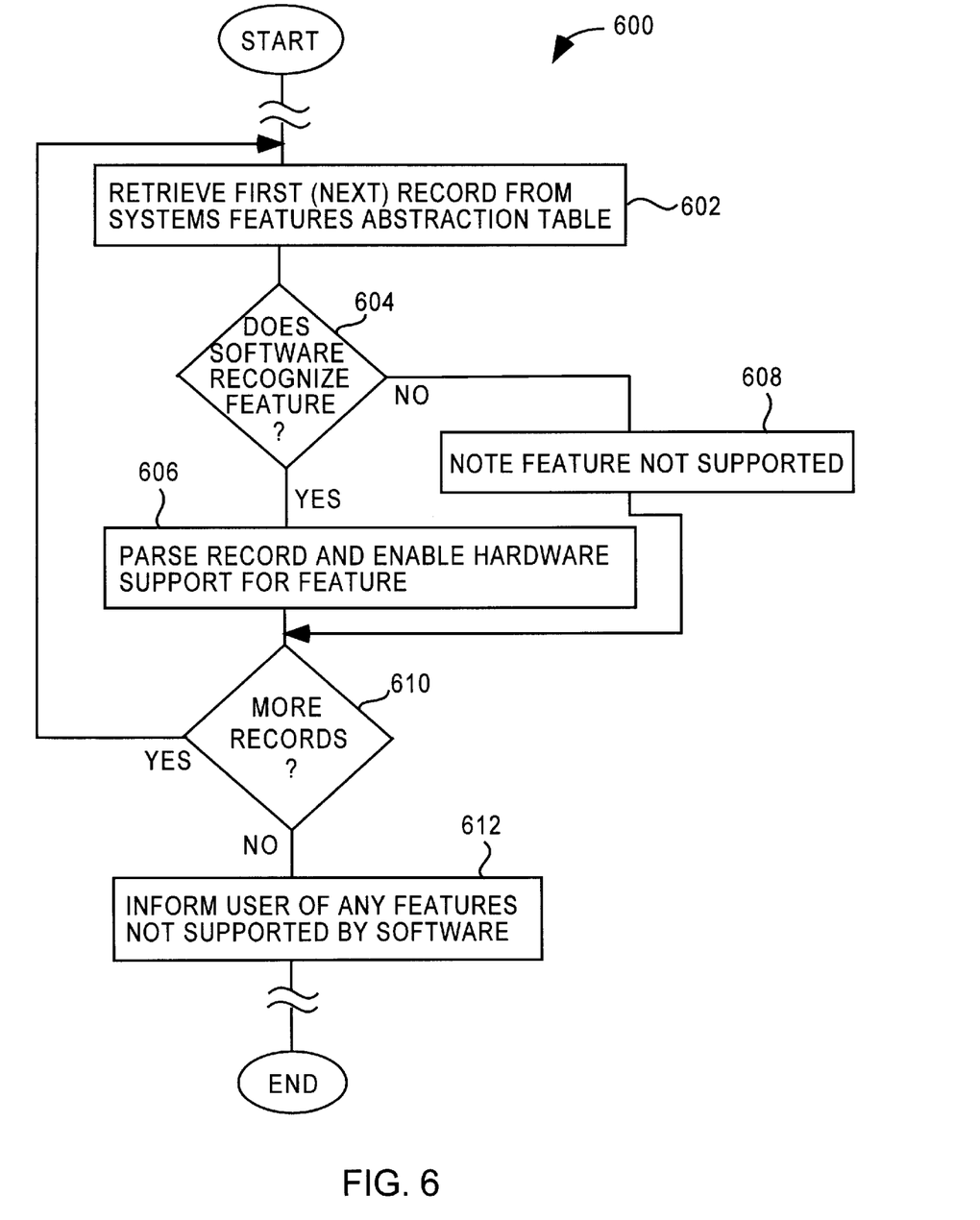
FIG. 6 is a flow diagram of an initialization procedure according to an embodiment of the invention.

FIG. 6 is a flow diagram of an initialization procedure 600 according to an embodiment of the invention. The initialization procedure 600 is preferably performed by the system management software 304 at power-on or re-boot of the computer system.

The initialization procedure 600 may include other operations besides those illustrated in FIG. 6. However, those other operations are not germane to the present invention. Therefore, the initialization procedure 600 illustrates only those operations associated with initializing a computer system to identify and enable those features supported by the system management software installed on the computer system.

The initialization procedure 600 initially retrieves 602 a first record from a systems features abstraction table. An example of such a record is a row in the systems features abstraction table 502 illustrated in FIG. 5B. Next, a decision block 604 determines whether the system management software recognizes the feature associated with the retrieved record. When the system management software does recognize the feature associated with the record, then the record is parsed 606 and hardware is enabled to support the feature.

On the other hand, when the system management software does not recognize the feature, then the initialization procedure 600 notes 608 that the feature is not supported. In this case, the feature is not supported by the system management software. Nevertheless, by noting 608 this feature, the initialization procedure is able to subsequently inform the user of the feature not being supported by the system management software.

Following either block 606 or block 608, a decision block 610 determines whether there are additional records (i.e., features) within the systems features abstraction table to be processed. If additional records are present, the initialization procedure 600 returns to repeat block 602 and subsequent blocks for the next record within the systems features abstraction table.

Once decision block 610 determines that there are no more additional records to be processed, a user is informed 612 of any features not supported by the systems management software. In this embodiment, the features that have been previously noted 608 as not being supported by the systems management software are the features on which the user is informed 612. When there are such non-supported features, the user can also be advised that to obtain full support for all the hardware features within the computer system, the user needs to upgrade the version of the system management software installed on their computer system.

The informing 612 of the user of the non-supported features is also useful in reducing service calls by service personnel when these non-supported features are either not monitored or lead to system failures or shut-down. For example, if a newly added redundant processor fan in a computer system is not supported by the system management software installed on the computer system, and the processor fan (that is supported) fails, then the processor might be shut down. With the invention, the informing 612 can display a message to the user that the redundant processor fan is not supported by the installed version of the system management software, and that a later version of the system management software is needed to support the redundant processor fan. Hence, the user is informed that the system management software is not able to fully monitor and manage the computer system to minimize shut downs, failures or other losses in performance, and thus averts some service calls.

Following block 612, the initialization procedure 600 is complete and ends. However, additional other initialization processing not associated with the invention may be performed.

Figure 7A:
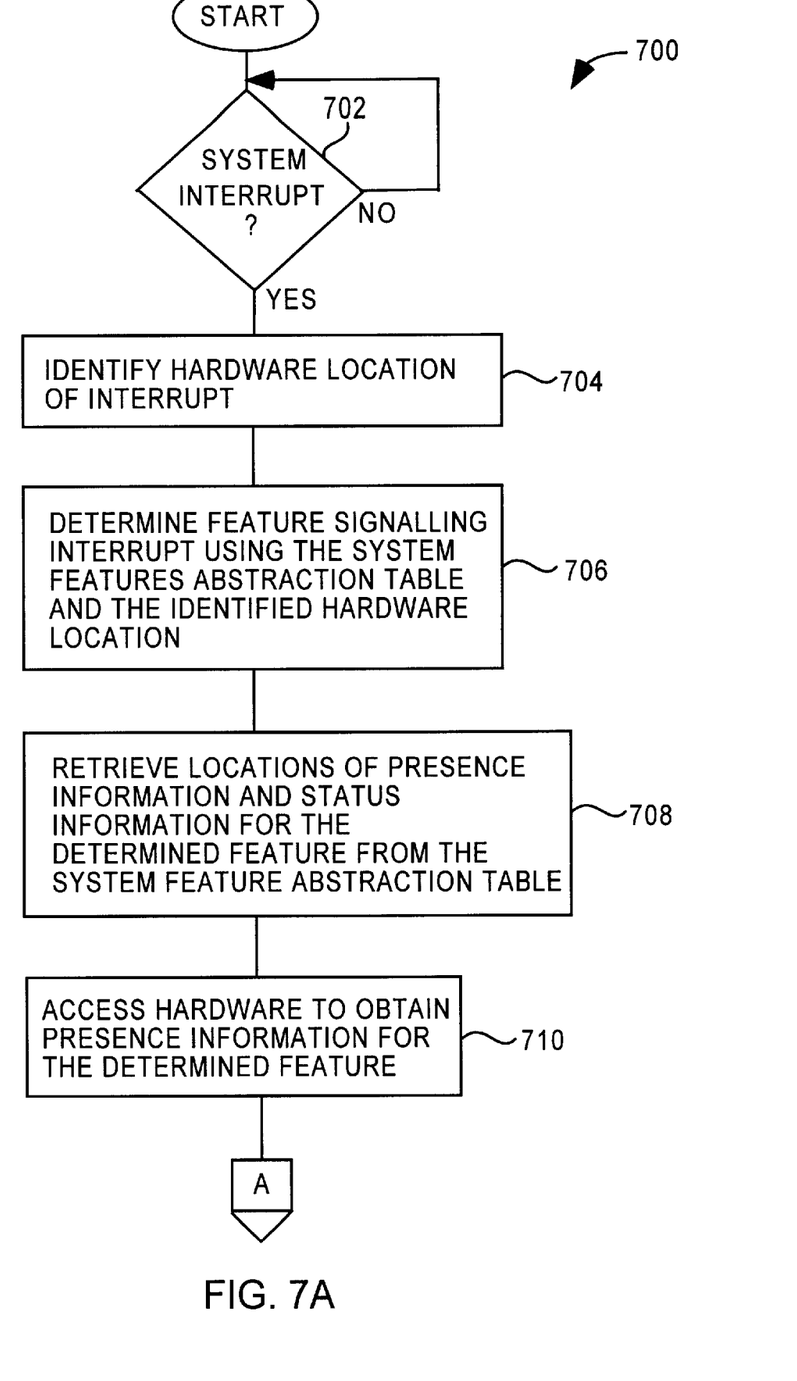
FIGS. 7A and 7B are flow diagrams of system management software for monitoring hardware features of a computer system according to an embodiment of the invention.
Figure 7B:
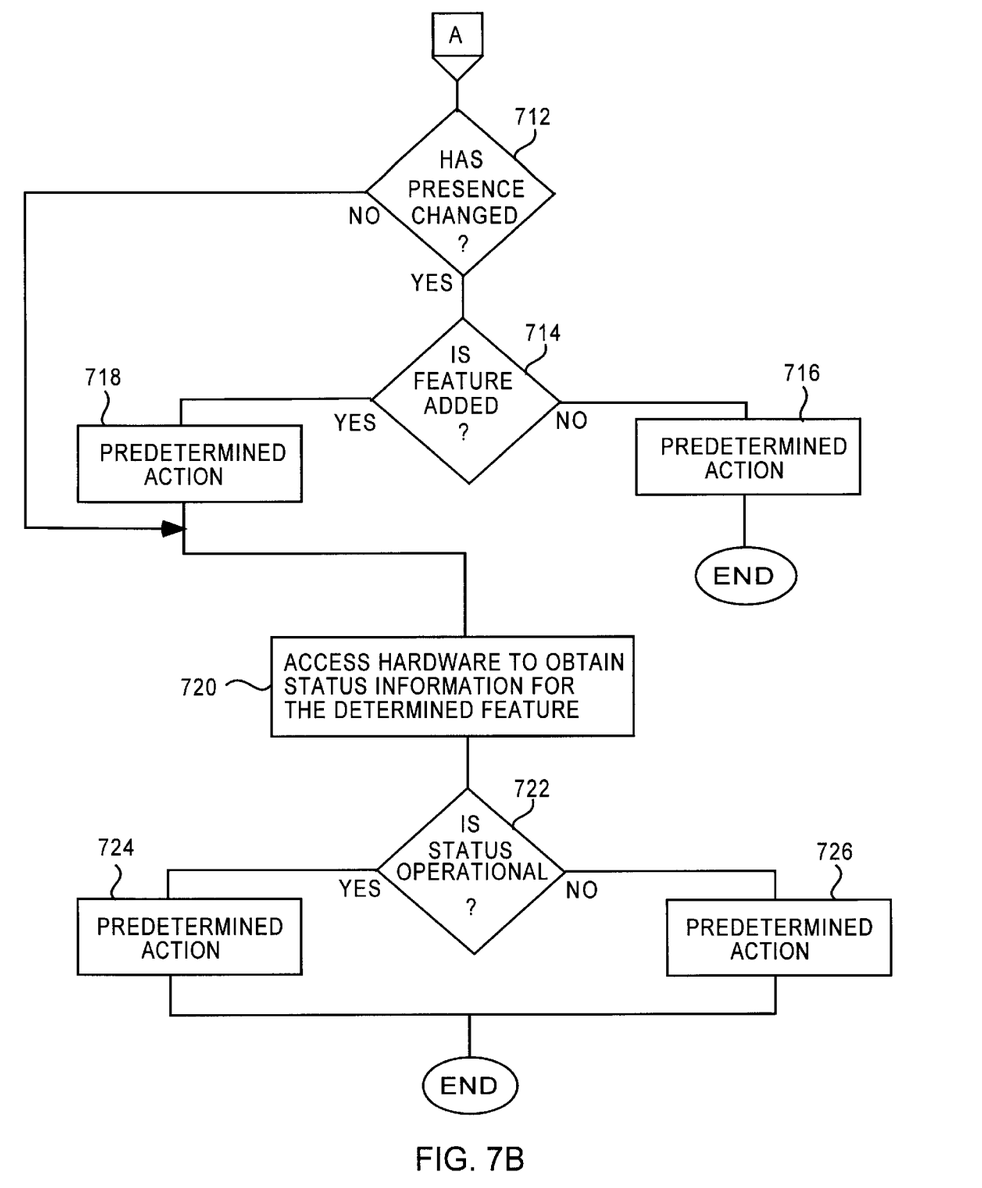

FIGS. 7A and 7B are flow diagrams of system management software for monitoring hardware features of a computer system according to an embodiment of the invention. In one embodiment, the system management software can be the system management software 304 illustrated in FIG. 3.

The system management processing 700 begins with a decision block 702 that determines whether a system interrupt has occurred. As long as a system interrupt has not occurred, the system management processing 700 awaits the receipt of a system interrupt. On the other hand, once a system interrupt has occurred, the system management processing 700 proceeds. Preferably, the system management processing 700 is activated after a system interrupt occurs and thus does not actually wait for the reception of a system interrupt. Alternatively, the system management processing 700 need not be interrupt driven but could be periodically polled.

In any event, following the decision block 702, the system management processing 700 identifies 704 the hardware location of the interrupt. The computer system can received a number of interrupts in various ways. The hardware location of the incoming interrupt serves as an indication of the source of the interrupt. The system management processing 700 then determines 706 the particular hardware feature of the computer system that is signaling the interrupt. Here, the particular hardware feature signaling the interrupt is determined 706 using the system features abstraction table and the identified hardware location. More particularly, the identified hardware location is compared with the control information from the system features abstraction table, and when a match has been found, the associated feature is determined to be the feature signaling the interrupt.

Once the feature has been determined, locations of presence information and status information are retrieved 708 for the determined feature from the system features abstraction table. Generally speaking, the location of the presence information and the location of the status information are respective locations within the hardware of the computer system where the presence information and the status information can be found. In one embodiment, the locations being retrieved 708 identify an access mechanism and position within the access mechanism where the presence information can be obtained for the determined feature, and an access mechanism and position within the access mechanism where the status information can be obtained for the determined feature.

Next, presence processing is performed by the system management processing 700. The hardware is accessed 710 to obtain presence information for the determined feature. Here, the hardware is accessed 710 at the retrieved location of the presence information. Preferably, the presence information is obtained from the hardware of the computer system using the associated access mechanism and the position therein that has been determined for the determined feature.

Next, a decision block 712 determines whether the presence has changed. The determining of whether the presence has changed is performed by comparing the obtained presence information for the determined feature with the previous presence state for the determined feature. The previous presence state is stored by the system management processing 700. If the presence has not changed, then the remaining part of the presence processing is bypassed because there is no need to perform any additional presence processing.

On the other hand, when the presence has changed, the presence processing continues with a decision block 714 that determines whether the determined feature has been added. When the decision block 714 determines that the feature has not been added (e.g., has been removed), a predetermined action 716 is performed, and then the system management processing 700 is complete and ends. In this case, the system management processing 700 ends following block 716 because there is no need to perform status processing when the feature is not present. Alternatively, when the decision block 714 determines that the determined feature has been added, a predetermined action 718 is performed.

Following the block 718, as well as following the decision block 712 when the presence does not change, the system management processing 700 continues with status processing. The status processing accesses 720 the hardware to obtain status information for the determined feature. Then, a decision block 722 determines whether the obtained status for the determined feature is "operational". If the status of the determined feature is determined to be "operational", then a predetermined action 724 is performed. Otherwise, when the status is determined not to be "operational", a predetermined action 726 is performed. Following blocks 724 and 726, the system management processing 700 is complete and ends.

The predetermined actions 716, 718, 724 and 726 are normally different actions taken in response to the combination of presence and status conditions for the determined feature. As an example, Table 1 provided below illustrates the predetermined actions that would be taken based on the presence and status information for a fan feature.

TABLE 1

| PRESENCE | STATUS | ACTION |
| --- | --- | --- |
| Not Present | (don't care) | Shutdown Computer |
| Present | Failure | Shutdown Computer |
| Present | Operating | Nothing |

Figure 8A:
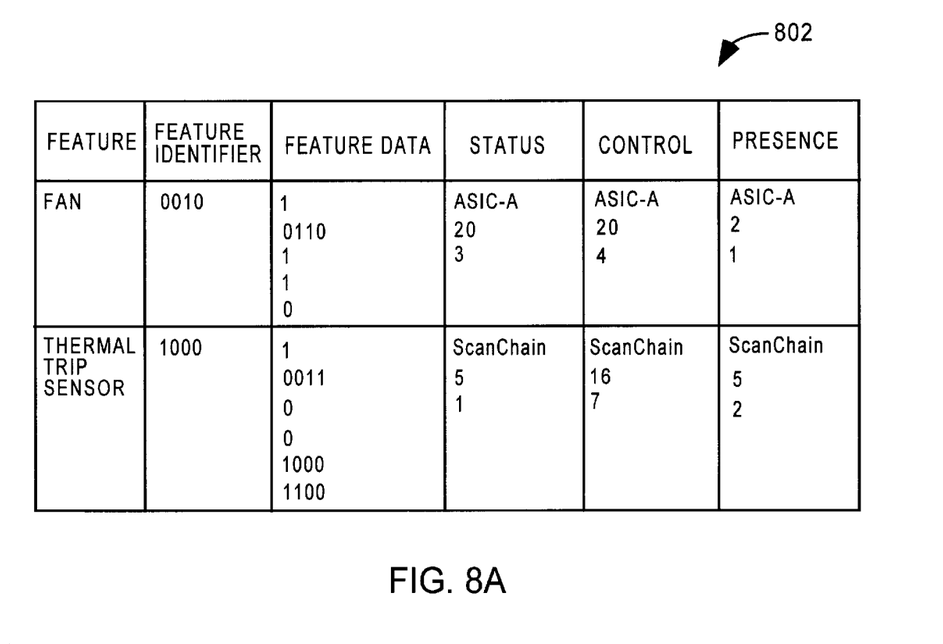
FIGS. 8A and 8B contain examples of simplified system features abstraction tables for two different versions of a computer system.
Figure 8B:
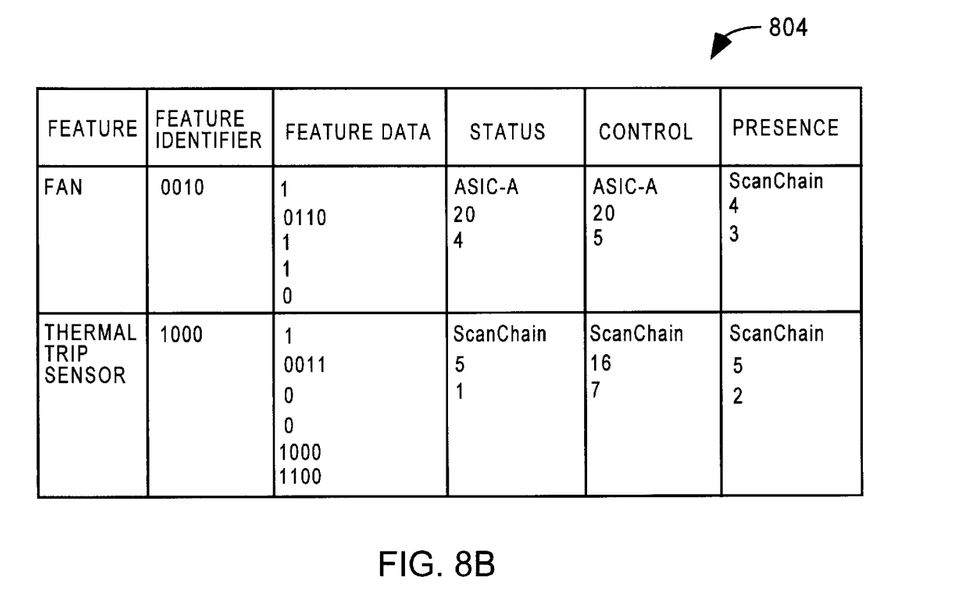

As an example of the operation of the invention, FIGS. 8A and 8B contain examples of simplified system features abstraction tables 802, 804 for two different versions of a computer system. The invention is, however, not limited to operating in this manner or in accordance with this particular example.

For this example, assume that the system features abstraction table 802 is provided with a first version of a computer system, and that the system features abstraction table 804 is provided with a second version of the same computer system. Also assume that the computer systems have a fan and a thermal trip sensor, and other hardware features not depicted in the system features abstraction tables 802, 804. Further assume that the thermal trip sensor is implemented the same in both versions, but that the fan feature is implemented differently.

In the first version of the computer system, the system features abstraction table 802 indicates by the identifier "0010" the fan feature and by the identifier "1000" the thermal trip sensor. For the fan feature, the feature data indicates that the fan is: fan number one; it is at location "0010" which is on processor board; is required; is a CPU fan; and is not redundant. The status information indicates that the location of the status information within the computer system is with mechanism ASIC-A at position byte 20, bit 3. ASIC refers to application specific integrated circuit. The control information indicates that the location of the control information within the computer system is with mechanism ASIC-A at position byte 20, bit 4. The presence information indicates that the location of the presence information within the computer system is with mechanism ASIC-A at position byte 2, bit 1.

For the thermal trip sensor, the feature data indicates that the thermal trip sensor is: thermal trip sensor number 1; is at location "0011" which is on chassis; is not required; is not redundant; has a caution threshold of "1000"; and has a critical threshold of "1100". The quantities "1000" and "1100" of the thresholds scale to temperature amounts. The status information indicates that the location of the status information within the computer system is with mechanism ScanChain at position byte 5, bit 1. The control information indicates that the location of the control information within the computer system is with mechanism ScanChain at position byte 16, bit 7. The presence information indicates that the location of the presence information within the computer system is with mechanism ScanChain at position byte 5, bit 2.

In the second version of the computer system, the system features abstraction table 804 is similar to the system features abstraction table 802. However, because the fan feature was implemented differently in the second version of the computer system than in the first version, the system features abstraction table 804 is different from the system features abstraction table 802. Hence, with respect to the thermal trip sensor, the entries in the system features abstraction table 804 are identical to the corresponding entries in the system features abstraction table 802. However, with respect to the fan feature, because of the different implementations, the status information, the control information, and the presence information have changed. Specifically, the status information indicates that the location of the status information within the computer system is with mechanism ASIC-A at position byte 20, bit 4. The control information indicates that the location of the control information within the computer system is with mechanism ASIC-A at position byte 20, bit 5. The presence information indicates that the location of the presence information within the computer system is with mechanism ScanChain at position byte 4, bit 3. Hence, the bit positions were altered for the status and control information, and the mechanism and position were altered for the presence information.

Despite the changes in implementation, the changed system features abstraction table enables the system management software released with the first version of the computer system to operate properly on the second version of the computer system (provided the access mechanisms used on the second version of the computer system are understood). Accordingly, the invention reduces the software maintenance burden when hardware features are implemented differently.

Figure 9:
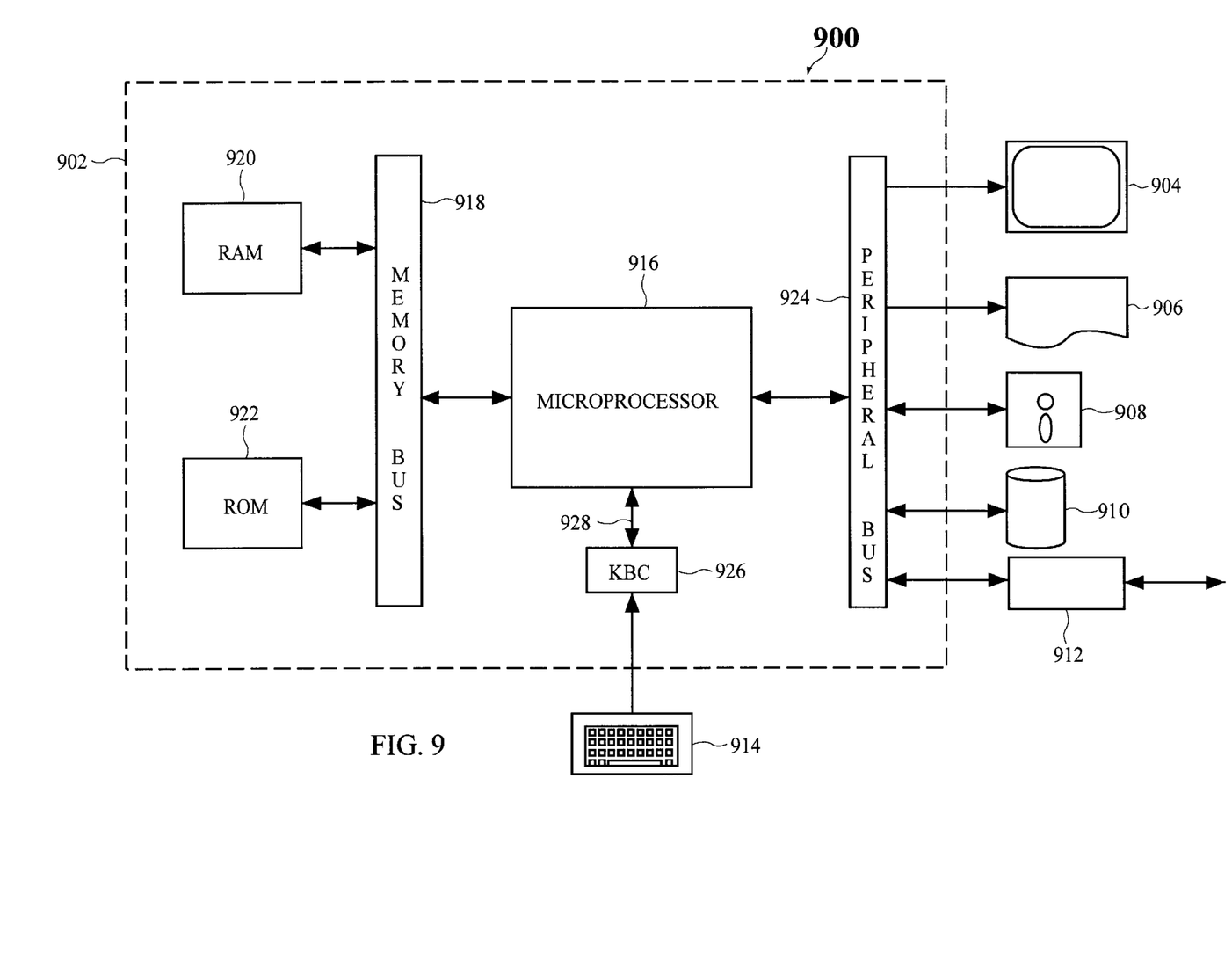
FIG. 9 is a block diagram of an exemplary computer system for carrying out the processing according to the invention.

FIG. 9 is a block diagram of an exemplary computer system 900 for carrying out the processing according to the invention. The computer system 900 includes a digital computer 902, a display screen (or monitor) 904, a printer 906, a floppy disk drive 908, a hard disk drive 910, a network interface 912, and a keyboard 914. The digital computer 902 includes a microprocessor 916, a memory bus 918, random access memory (RAM) 920, read only memory (ROM) 922, a peripheral bus 924, and a keyboard controller 926. The digital computer 900 can be a personal computer (such as an IBM compatible personal computer), a workstation computer (such as a Sun Microsystems or Hewlett-Packard workstation), or some other type of computer.

The microprocessor 916 is a general purpose digital processor which controls the operation of the computer system 900. The microprocessor 916 can be a single-chip processor or can be implemented with multiple components. Using instructions retrieved from memory, the microprocessor 916 controls the reception and manipulation of input data and the output and display of data on output devices. According to the invention, a particular function of microprocessor 916 is to perform system management processing.

The memory bus 918 is used by the microprocessor 916 to access the RAM 920 and the ROM 922. The RAM 920 is used by the microprocessor 916 as a general storage area and as scratch-pad memory, and can also be used to store input data and processed data. The ROM 922 can be used to store instructions or program code followed by the microprocessor 916 as well as other data. The ROM 922 also preferably stores the system features abstraction table 306 for the computer system 900.

The peripheral bus 924 is used to access the input, output, and storage devices used by the digital computer 902. In the described embodiment, these devices include the display screen 904, the printer device 906, the floppy disk drive 908, the hard disk drive 910, and the network interface 912. The keyboard controller 926 is used to receive input from keyboard 914 and send decoded symbols for each pressed key to microprocessor 916 over bus 928.

The display screen 904 is an output device that displays images of data provided by the microprocessor 916 via the peripheral bus 924 or provided by other components in the computer system 900. The printer device 906 when operating as a printer provides an image on a sheet of paper or a similar surface. Other output devices such as a plotter, typesetter, etc. can be used in place of, or in addition to, the printer device 906.

The floppy disk drive 908 and the hard disk drive 910 can be used to store various types of data. The floppy disk drive 908 facilitates transporting such data to other computer systems, and hard disk drive 910 permits fast access to large amounts of stored data.

The microprocessor 916 together with an operating system operate to execute computer code and produce and use data. The computer code and data may reside on the RAM 920, the ROM 922, or the hard disk drive 920. The system features abstraction table resides on the ROM 922. The computer code and data could also reside on a removable program medium and loaded or installed onto the computer system 900 when needed. Removable program mediums include, for example, CD-ROM, PC-CARD, floppy disk and magnetic tape. The operating system preferably includes a software layer which interfaces between the hardware and higher layers of the operating system. When device drivers want to communicate with the hardware (e.g., display 904, printer 906, drives 908 and 910) they do so by function calls to the software layer.

The network interface 912 is used to send and receive data over a network connected to other computer systems. An interface card or similar device and appropriate software implemented by the microprocessor 916 can be used to connect the computer system 900 to an existing network and transfer data according to standard protocols.

The keyboard 914 is used by a user to input commands and other instructions to the computer system 900. Other types of user input devices can also be used in conjunction with the present invention. For example, pointing devices such as a computer mouse, a track ball, a stylus, or a tablet can be used to manipulate a pointer on a screen of a general-purpose computer.

Figure 10:
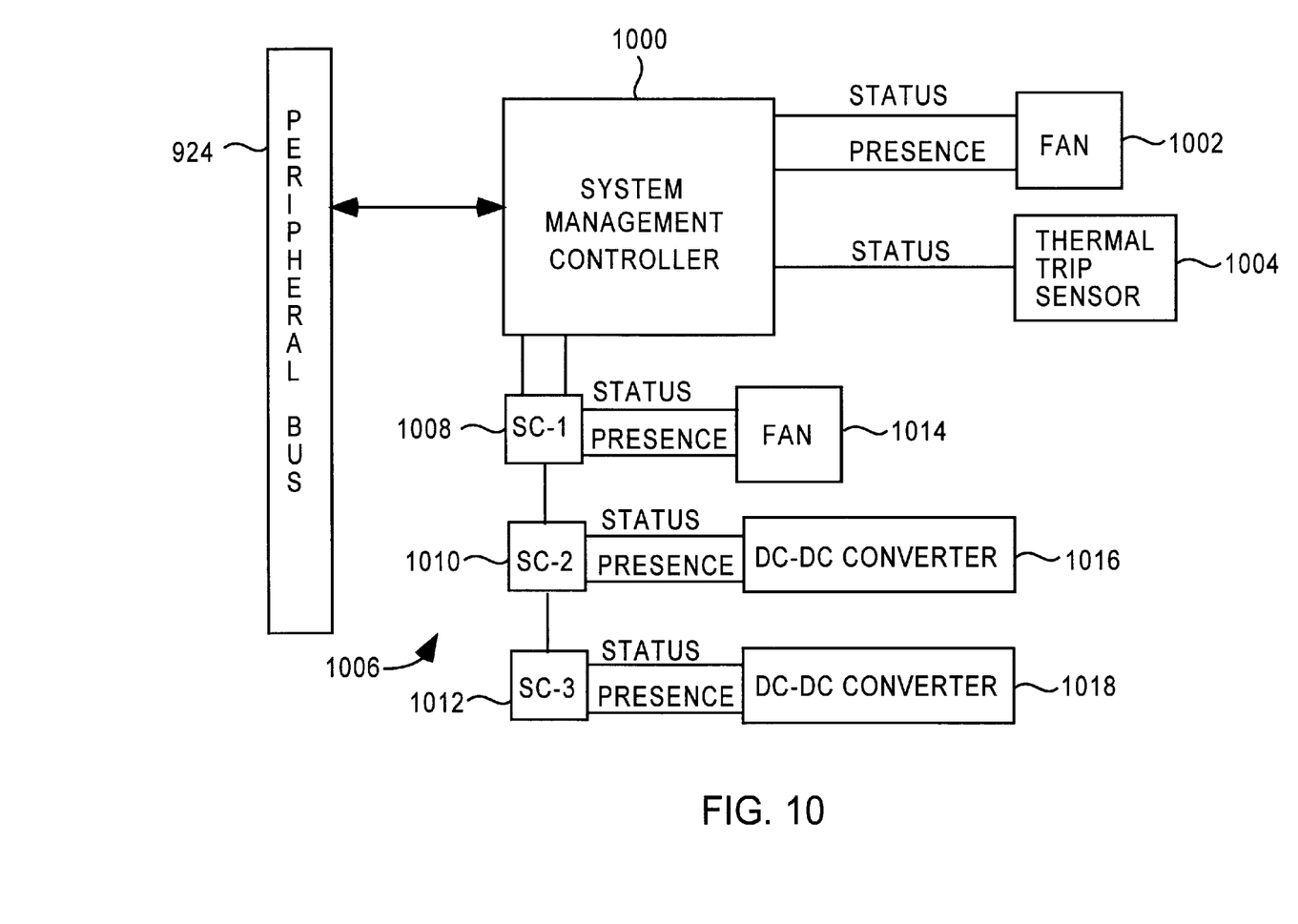
FIG. 10 is a block diagram of systems management circuitry coupled to a peripheral bus according to an embodiment of the invention.

FIG. 10 is a block diagram of systems management circuitry coupled to a peripheral bus according to an embodiment of the invention. The peripheral bus, for example, is the peripheral bus 924 illustrated in FIG. 9. The systems management circuitry couples to hardware features and the circuitry needed to monitor the hardware features. The systems management circuitry includes a system management controller 1000. The systems management controller 1000 may be implemented as an integrated circuit chip, such as an ASIC. In the embodiment illustrated in FIG. 10, the systems management controller 1000 directly monitors a fan 1002 with a status signal and a presence signal, and a thermal trip sensor 1004 with a status signal. The systems management controller 1000 also monitors other hardware features through a ScanChain 1006. The ScanChain 1006 includes a first ScanChain circuit (SC-1) 1008, a second ScanChain circuit (SC-2) 1010, and a third ScanChain circuit (SC-3) 1012. In this embodiment, the ScanChain 1006 is used to monitor a fan 1014 with status and presence signals, and DC-DC converters 1016 and 1018 with status and presence signals.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The advantages of the invention are numerous. One advantage of the invention is that changes to hardware implementations concerning features of a computer system are easily made and require only updating a system features table. Another advantage of the invention is that access mechanisms and positions therein of status and presence information for various features within a computer system are identified. As a result, the access mechanism as well as its position within the access mechanism is able to be changed without impacting the software in many cases. Still another advantage of the invention is that a user of the computer system can be notified of certain failed features or components within the computer system, preferably including notification the physical location of the failed feature or component within the computer system. Yet another advantage of the invention is the ability to inform a user when a feature or mechanism (typically newly added or modified feature) is not recognized and therefore unsupported by the software. As an example, the user might be informed that it is time to upgrade software when features or mechanisms are unsupported. Another advantage of the invention is the ability to monitor and report on degraded hardware conditions, such as a loss of redundancy conditions. Still another advantage of the invention is the ability to monitor and report on status changes to features or components (e.g., change in power supply consumption, bus utilization near peak threshold).

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer monitoring system, comprising:

a computer system being monitored, said computer system includes a plurality of hardware features that provide presence and status information on the respective hardware features within said computer system;

a system features table that stores predetermined feature information for the plurality of hardware features of said computer system, the feature information for each of the hardware features includes feature data that defines characteristics of the associated hardware feature, and an access mechanism and a position within the access mechanism for retrieving the presence information for the associated hardware feature; and system management software for performing system monitoring of the hardware of said computer system by retrieving the feature information on the respective hardware features from said system features table.

2. A computer monitoring system as recited in claim 1, wherein the feature information for each of the hardware features further includes an access mechanism and a position within the access mechanism for retrieving the status information for the associated hardware feature.

3. A computer monitoring system as recited in claim 1, wherein the feature information for each of the hardware features further includes an access mechanism and a position within the access mechanism for retrieving control information for the associated hardware feature, the control information being used to identify the particular one of the hardware features requesting service.

4. A computer monitoring system as recited in claim 3, wherein the feature information for each of the hardware features further includes an access mechanism and a position within the access mechanism for retrieving the status information for the associated hardware feature.

5. A computer monitoring system as recited in claim 1, wherein the feature information contained in said system features table further includes an access mechanism and an action for initializing the associated hardware feature.

6. A computer monitoring system as recited in claim 1, wherein said computer monitoring system individually determines whether each of the hardware features is supportable by said software management software, and thereafter said system management software operates in accordance with those of the hardware features that are supported.

7. A method for monitoring a computer system having a plurality of hardware features and a hardware resources table containing predetermined information on the hardware resources of the computer system, comprising the operations of:

(a) receiving a service request by a particular hardware feature of the computer system;

(b) retrieving locations of at least one of presence information and status information for the particular hardware feature from the hardware resources table for the computer system, the location of the presence information including an access mechanism and a position within the access mechanism, and the location of the status information including an access mechanism and a position within the access mechanism;

(c) obtaining at least one of presence information and status information for the particular hardware feature, the presence information being obtained using the retrieved location of the presence information, and the status information being obtained using the retrieved location of the status information; and (d) performing an appropriate action for the computer system based on the at least one of the presence information and the status information obtained.

8. A method as recited in claim 7, wherein said method uses both the presence information and the status information with respect to said retrieving (b), said obtaining, and said performing (d).

9. A method as recited in claim 8, wherein said obtaining (c) comprises:

(c1) obtaining the presence information for the particular hardware feature using the access mechanism and the position within the access mechanism for the presence information; and (c2) obtaining the status information for the particular hardware feature using the access mechanism and the position within the access mechanism for the status information.

10. A method as recited in claim 9, wherein the access mechanism is selected from the group consisting of scan chain, memory address, I/O port and $I_2C$.

11. A method as recited in claim 8, wherein the hardware resources table is stored in non-volatile storage associated with the computer system.

12. A method as recited in claim 8, wherein said receiving (a) comprises:

identifying the particular hardware location within the computer system for the service request; and determining the particular hardware feature making the service request based on the identified hardware location and the hardware resources table.

13. A method as recited in claim 8, wherein said retrieving (b) retrieves initialization information for the particular hardware feature from the hardware resources table, and wherein said method further comprises:

(e) performing an initialization operation for the particular hardware feature in accordance with the initialization information.

14. A method as recited in claim 8, wherein said performing (d) identifies one or more of the hardware features that are degraded or have failed, and wherein said performing (d) operates to avoid failure of the computer system and takes into consideration any redundancy for the particular hardware features.

15. A method as recited in claim 8, wherein said performing (d) identifies one or more of the hardware features that are degraded.

16. A method as recited in claim 15, wherein said performing (d) monitors the computer system to determine if at least one of the hardware features are degraded or have failed, and wherein said method further comprises: (e) identifying a physical location of the at least one of the hardware features determined to be degraded or failed.

17. A method as recited in claim 8, wherein said performing (d) identifies one or more of the hardware features that have undergone a status change.

18. A method as recited in claim 17, wherein said performing (d) further operates to avoid failure of the computer system and takes into consideration any redundancy for the particular hardware features.

19. A method as recited in claim 17, wherein said performing (d) monitors the computer system to determine if at least one of the hardware features are degraded or have failed, and wherein said method further comprises: (e) identifying a physical location of the at least one of the hardware features determined to be degraded, failed or undergone a status change.

20. A computer readable medium containing program instructions for monitoring a computer system having a plurality of hardware features and a hardware resources table containing predetermine information on the hardware resources of the computer system, said computer readable medium comprising:

first computer readable code for receiving a service request by a particular hardware feature of the computer system;

second computer readable code for retrieving a location of condition information for the particular hardware feature from the hardware resources table for the computer system, the location of the condition information including an access mechanism and a position within the access mechanism from which the condition information can be obtained;

third computer readable code for obtaining the condition information for the particular hardware feature, the condition information being obtained using the retrieved location of the condition information; and fourth computer readable code for performing an appropriate action for the computer system based on the condition information obtained.

21. A computer readable medium as recited in claim 20, wherein the condition information is at least one of presence information and status information.

22. A computer readable medium as recited in claim 20, wherein the condition information includes presence information and status information, wherein said second computer readable code retrieves locations of the presence information and the status information for the particular hardware feature from the hardware resources table for the computer system, the location of the presence information including an access mechanism and a position within the access mechanism, and the location of the status information including an access mechanism and a position within the access mechanism, and wherein said third computer readable code for obtaining the presence information and the status information for the particular hardware feature, the presence information being obtained using the retrieved location of the presence information, and the status information being obtained using the retrieved location of the status information.

23. A computer readable medium as recited in claim 20, wherein said second computer readable code retrieves initialization information for the particular hardware feature from the hardware resources table, and wherein said computer readable medium further comprises:

fifth computer readable code for performing an initialization operation for the particular hardware feature in accordance with the initialization information.

24. A computer readable medium as recited in claim 20, wherein said computer readable medium further comprises:

fifth computer readable code identifying the particular hardware location within the computer system for the service request; and sixth computer readable code determining the particular hardware feature making the service request based on the identified hardware location and the hardware resources table.

25. A disk storage monitoring system, comprising:

a disk storage apparatus being monitored, said disk storage apparatus includes a plurality of hardware features that provide presence and status information on the respective hardware features within said disk storage apparatus;

a system features table that stores predetermined feature information for the plurality of hardware features of said disk storage apparatus, the feature information for each of the hardware features includes feature data that defines characteristics of the associated hardware feature, and an access mechanism and a position within the access mechanism for retrieving the presence information for the associated hardware feature; and system management software for performing system monitoring of the hardware of said disk storage apparatus by retrieving the feature information on the respective hardware features from said system features table.

26. A disk storage monitoring system as recited in claim 25, wherein the feature information for each of the hardware features further includes an access mechanism and a position within the access mechanism for retrieving the status information for the associated hardware feature.

27. A disk storage monitoring system as recited in claim 25, wherein the feature information for each of the hardware features further includes an access mechanism and a position within the access mechanism for retrieving control information for the associated hardware feature, the control information being used to identify the particular one of the hardware features requesting service.

28. A disk storage monitoring system as recited in claim 27, wherein the feature information for each of the hardware features further includes an access mechanism and a position within the access mechanism for retrieving the status information for the associated hardware feature.

29. A disk storage monitoring system as recited in claim 25, wherein the feature information contained in said system features table further includes an access mechanism and an action for initializing the associated hardware feature.

30. A disk storage monitoring system as recited in claim 25, wherein said disk storage monitoring system individually determines whether each of the hardware features is supportable by said software management software, and thereafter said system management software operates in accordance with those of the hardware features that are supported.

31. A computer system, said computer system comprising:

a plurality of hardware features;

a hardware resources table containing predetermined information on the hardware features;

a processing unit for carrying out program instructions;

memory for storing data;

system monitoring unit, including at least means for receiving a service request by a particular hardware feature of the computer system;

means for retrieving a location of condition information for the particular hardware feature from the hardware resources table for the computer system, the location of the condition information including an access mechanism and a position within the access mechanism from which the condition information can be obtained;

means for obtaining the condition information for the particular hardware feature, the condition information being obtained using the retrieved location of the condition information; and means for performing an appropriate action for the computer system based on the condition information obtained.

* * * * *